United States Patent [19]

Myohga

[11] Patent Number: 5,192,889
[45] Date of Patent: Mar. 9, 1993

[54] ULTRASONIC MOTOR DRIVER

[75] Inventor: Osamu Myohga, Tokyo, Japan

[73] Assignee: NEC Corporation, Tokyo, Japan

[21] Appl. No.: 841,551

[22] Filed: Feb. 26, 1992

[30] Foreign Application Priority Data

Mar. 4, 1991 [JP] Japan .................... 3-37007

[51] Int. Cl.⁵ .................................. H01L 41/08
[52] U.S. Cl. .................... 310/316; 310/317; 310/323; 318/116
[58] Field of Search ............... 310/316, 317, 319, 323; 318/116

[56] References Cited

U.S. PATENT DOCUMENTS

| | | | |
|---|---|---|---|
| 4,713,571 | 12/1987 | Suzuki et al. | 310/316 |
| 4,749,896 | 6/1988 | Suzuki et al. | 310/316 |
| 4,794,294 | 12/1988 | Shimizu et al. | 310/316 |
| 4,833,358 | 5/1989 | Suzuki et al. | 310/316 |
| 4,888,514 | 12/1989 | Takahashi et al. | 310/316 |
| 4,926,084 | 5/1990 | Furutsu et al. | 310/316 |
| 5,021,700 | 6/1991 | Takahashi et al. | 310/316 |

Primary Examiner—Mark O. Budd
Attorney, Agent, or Firm—Burns, Doane, Swecker & Mathis

[57] ABSTRACT

An ultrasonic motor driver includes a voltage-current phase difference detector for detecting a phase difference between an applied voltage and a current of a torsional vibration piezoelectric element and a phase shifter for adjusting phases of voltages applied to the longitudinal and torsional vibration piezoelectric elements so that the phase difference is minimum. Even if changes in application environment, e.g., an external force or temperature, occur, a rotational speed can be kept stable to drive an ultrasonic motor.

3 Claims, 3 Drawing Sheets

ULTRASONIC MOTOR DRIVER

BACKGROUND OF THE INVENTION

The present invention relates to an ultrasonic motor driver and, more particularly, to an ultrasonic motor driver using a longitudinal/torsional vibrator assembly as a stator.

A high-frequency voltage as an ultrasonic voltage is generally applied to an ultrasonic motor to drive it. Extensive studies and developments have been made to realize a practical traveling wave ultrasonic motor or a standing wave ultrasonic motor using a traveling wave or a longitudinal/torsional vibrator assembly. Extensive studies and developments of a driving power source have been also made.

By changes in application environment, e.g., an applied external force or temperature, an optimal driving frequency of the ultrasonic motor is changed as a function of time. The change in optimal frequency occurs in all types of traveling and standing wave motors.

A conventional ultrasonic motor driver tracks a change in optimal drive frequency, and has a frequency tracking drive method of changing a practical frequency corresponding to the optimal frequency.

In a standing wave ultrasonic motor using the longitudinal/torsional vibrator assembly, as is well known, when longitudinal and torsional vibrations have a phase difference of 90°, the torsional vibration excited by the stator is most effectively transmitted to the rotor. Voltages (to be referred to as excitation voltages hereinafter) applied to the longitudinal and torsional vibrators as ceramic piezoelectric elements are voltages having an appropriate phase difference set such that a phase difference between the vibrations of the vibrators is 90°. In this case, since electric impedances of the piezoelectric elements are different, the phase difference between the both excitation voltages is not always limited to the phase difference of 90°. The phase difference between the excitation voltages, however, is changed as in the driving frequency by the changes in application environment, e.g., the external force or temperature applied to the ultrasonic motor.

FIG. 2 shows an example of relationships among a phase difference $\theta_T$ between a torsional excitation voltage and a torsional excitation current, a current value $I_T$, and a rotational speed N of the rotor when a phase difference $\phi_T$ between the longitudinal and torsional excitation voltages of the standing wave ultrasonic motor using the longitudinal/torsional vibrator assembly is changed. FIG. 3 shows an example of relationships among a phase difference $\theta_L$ between a longitudinal excitation voltage and a longitudinal excitation current, a current value $I_L$, and the rotational speed N of the rotor when a phase difference $\phi_L$ between the longitudinal and torsional excitation voltages is changed in the same manner as in FIG. 2.

It is understood that the phase difference $\theta_L$ between the longitudinal excitation voltage and current is not changed at all with the change in the phase difference $\phi_L$ between the longitudinal and torsional excitation voltages as indicated in FIG. 3. As indicated in FIG. 2, the phase difference $\phi_T$ between the torsional excitation voltage and current is changed with the change in the phase difference $\phi_T$ between the longitudinal and torsional excitation voltages. In addition, as indicated in FIG. 2, it is apparent that the phase difference $\theta_T$ between the torsional excitation voltage and current and the rotational speed N are faithfully changed with the change in the phase difference $\phi_T$ between the longitudinal and torsional excitation voltages. That is, when the rotational speed N is maximum, the phase difference $\phi_T$ between the torsional excitation voltage and current is minimized, and when the rotational speed N is minimum, the phase difference $\phi_T$ is maximized.

In the above conventional ultrasonic motor drive method, a driving frequency is changed by tracking the change in optimal driving frequency. There is no countermeasure against the change in optimal phase difference between longitudinal and torsional excitation voltages when the application environment, e.g., an external force or temperature applied to the ultrasonic motor is changed. Therefore, the ultrasonic motor is not always driven in an optimal drive condition because of changes in application environment.

SUMMARY OF THE INVENTION

It is an object of the present invention to provide an ultrasonic motor driver capable of a stable operation against any change in application environment.

In order to achieve the above object of the present invention, there is provided an ultrasonic motor driver comprising an ultrasonic motor using a longitudinal/torsional vibrator assembly as a stator, excited by a voltage of a high frequency as an ultrasonic frequency and having first and second piezoelectric elements for respectively generating longitudinal and torsional vibrations, voltage-current phase difference detecting means for detecting a phase difference between a voltage and a current applied to the second piezoelectric element, and phase shifting means for adjusting phases of two voltages applied to the first and second piezoelectric elements so that the phase difference detected by the voltage-current phase difference detecting means is minimized.

DETAILED DESCRIPTION OF THE PREFERRED EMBODIMENT

An embodiment of the present invention will be described with reference to the accompanying drawing.

Figure 1:
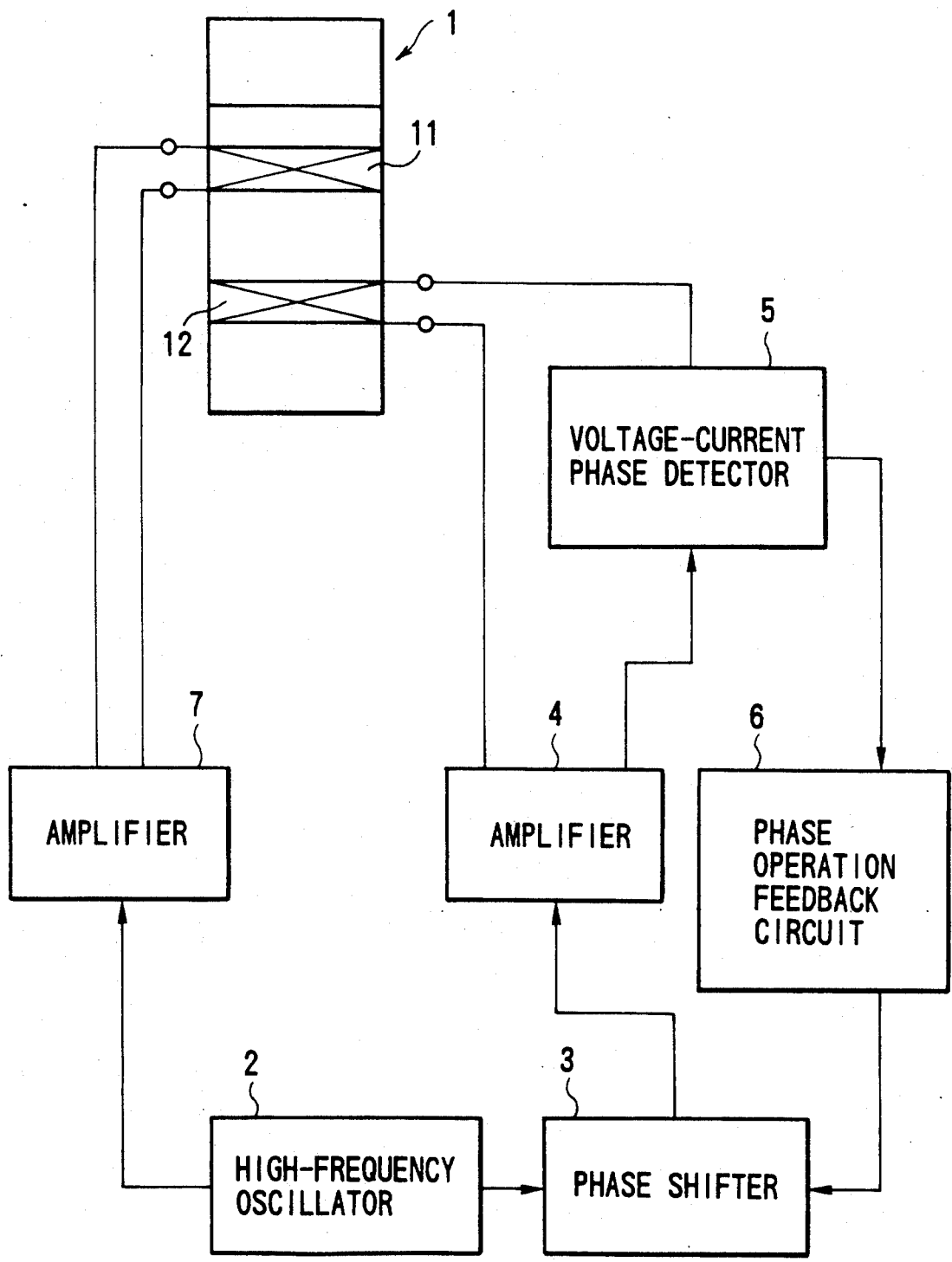
FIG. 1 is a block diagram showing an embodiment of an ultrasonic motor driver of the present invention.

FIG. 1 is a block diagram showing an embodiment of an ultrasonic motor driver of the present invention.

The ultrasonic motor driver of this embodiment as shown in FIG. 1 comprises an ultrasonic motor 1 having a longitudinal vibration piezoelectric element 11 and a torsional vibration piezoelectric element 12, a high-frequency oscillator 2 for oscillating a high-frequency output having an ultrasonic frequency, a phase shifter 3 for receiving an output from the high-frequency oscillator 2, amplifiers 4 and 7 for respectively receiving outputs from the phase shifter 3 and the high-frequency oscillator 2, a voltage-current phase detector 5 for receiving an output from the amplifier 4, and a phase operation feedback circuit 6 for receiving an output from the voltage-current phase detector 5 and supplying a feedback output to the phase shifter 3.

An operation of this embodiment will be described below.

The high-frequency oscillator 2 oscillates a high-frequency output having an ultrasonic frequency and supplies a high-frequency oscillation output to the amplifier 7 and the phase shifter 3.

The amplifier 7 amplifies the high-frequency oscillation output, and supplies the output as a longitudinal excitation voltage to the longitudinal vibration piezoelectric element 11 of the ultrasonic motor 1, thereby driving the longitudinal vibration piezoelectric element 11. The phase shifter 3 phase-shifts the high-frequency output and supplies an output to the amplifier 4. The output amplified by the amplifier 4 is supplied as a torsional excitation voltage to the torsional vibration piezoelectric element 12 through the voltage-current phase detector 5, thereby driving the torsional vibration piezoelectric element 12. The voltage-current phase detector 5 detects a phase difference between the torsional excitation voltage and its current applied to the torsional vibration piezoelectric element 12, and supplies a detection output to the phase operation feedback circuit 6. The phase operation feedback circuit 6 adjusts the phase of the output from phase shifter 3 so that the detected phase difference is minimized. The phase operation feedback circuit 6 has an operation function of converting the phase difference detected by the voltage-current phase detector 5 to a voltage, and a phase adjusting function of controlling the phase of the output from the phase shifter 3 so that the converted voltage is minimized.

An operation of this embodiment will be described below using numerical values.

Figure 2:
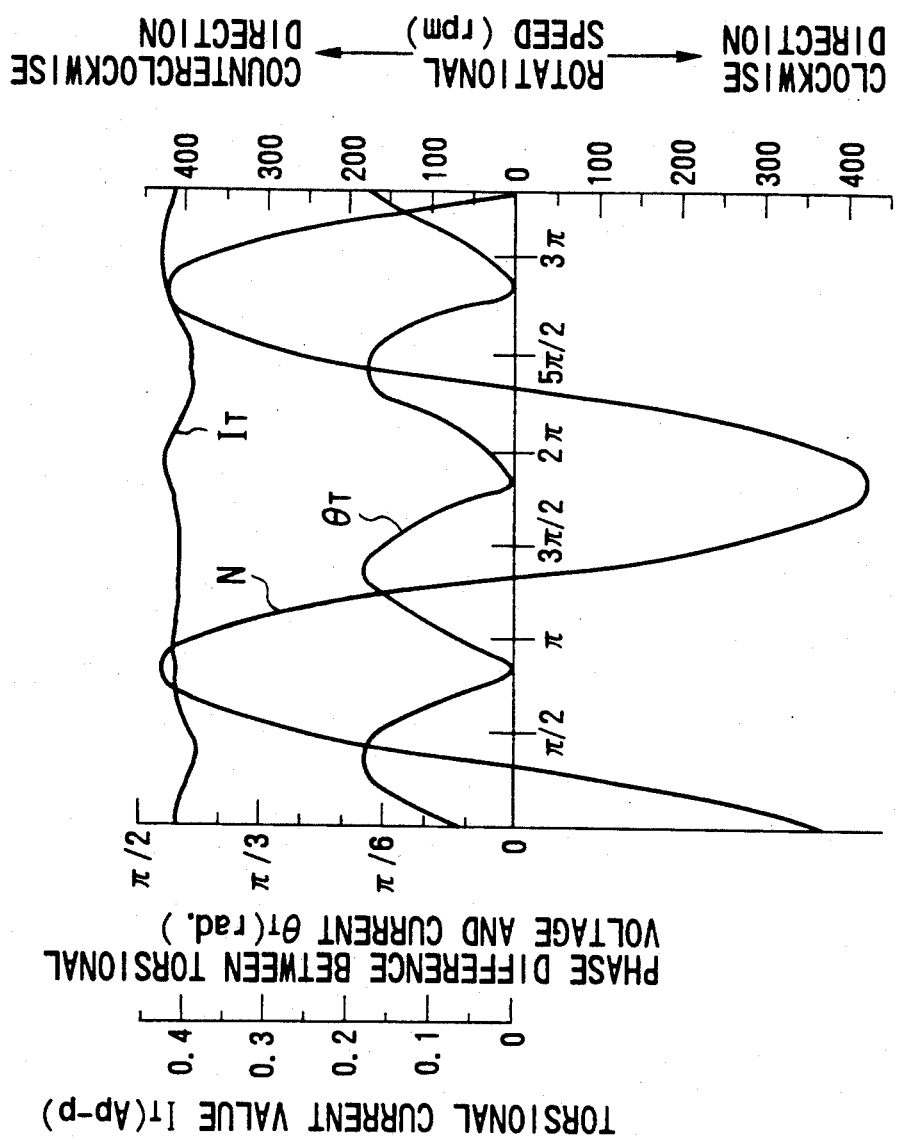
FIG. 2 shows an example of relationships among a phase difference between a torsional excitation voltage and a torsional excitation current, a current value, and a rotational speed as a function of a phase difference between longitudinal and torsional excitation voltages in an ultrasonic motor using a longitudinal torsional vibrator assembly.
Figure 3:
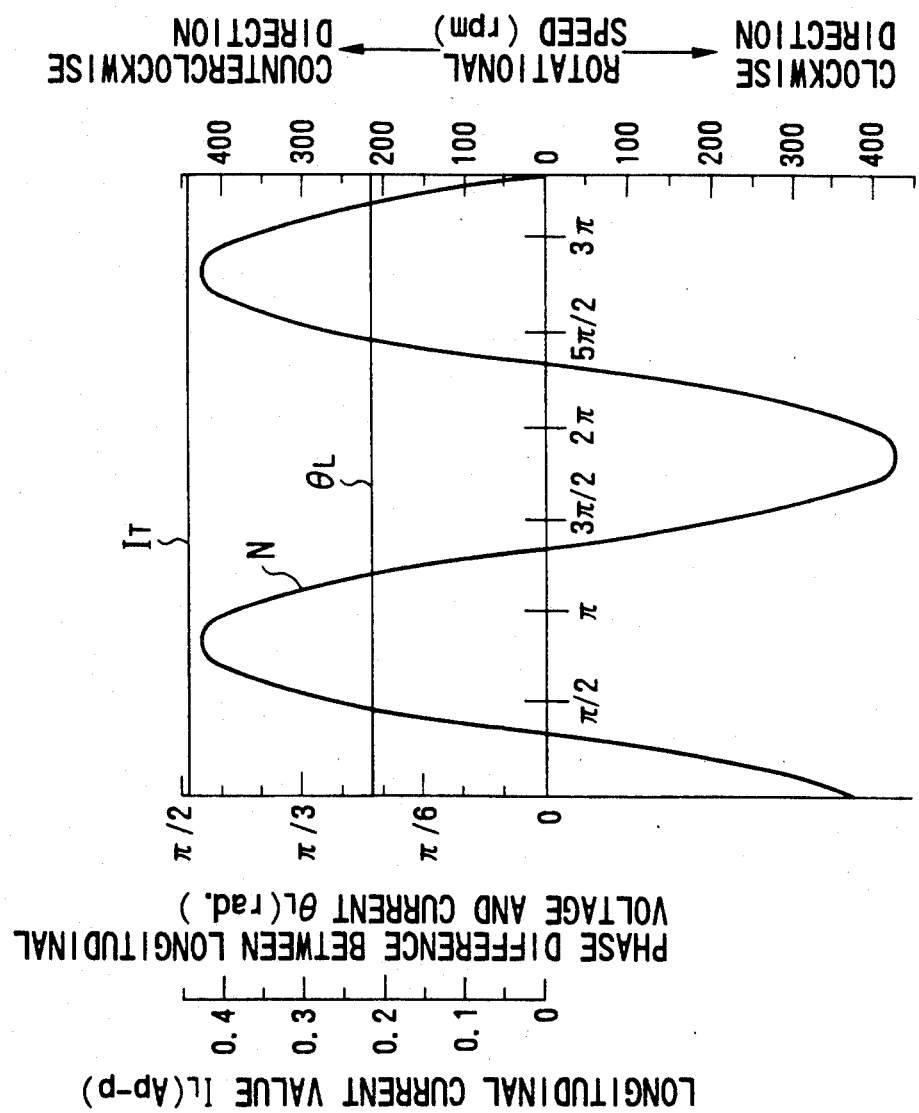
FIG. 3 shows an example of relationships among a phase difference between a longitudinal excitation voltage and a longitudinal excitation current, a current value, and the rotational speed as a function of a phase difference between longitudinal and torsional excitation voltages in the ultrasonic motor using the longitudinal/torsional vibrator assembly.

40-Vrms longitudinal and torsional excitation voltages are applied across a standing ultrasonic motor 1 using a longitudinal/torsional vibrator assembly having an optimal driving frequency of 32.6 KHz and an optimal phase difference $P_0$ between the longitudinal and torsional excitation voltages of 40°. The ultrasonic motor 1 is continuously driven in a frequency tracking drive circuit of tracking the frequency changed with a change in optimal driving frequency. At this time, the phase operation feedback circuit 6 is disconnected to check that a rotational speed of the ultrasonic motor 1 can be kept stable by adjusting a phase difference $\theta_1$ between the torsional excitation voltage and its current. That is, the phase is driven in an open loop. In this condition, a rotational speed N right after the start of driving is 500 rpm, and the rotational speed N after five hours is decreased to 350 rpm. By measurement of an oscilloscope instead of the voltage-current phase detector 5, the phase shifter 3 is manually adjusted so that the phase difference $\theta_1$ between the torsional excitation voltage and its current is optimally zero as shown in FIG. 2. As a result, the rotational speed N is increased to 510 rpm, which is close to the rotational speed right after the start of driving. In this state, when the motor is left still in an atmosphere at 60° C. for two hours, the rotational speed N is decreased to 410 rpm. By the same manual adjustment as described above, the rotational speed N is increased to 495 rpm. Subsequently, the disconnected phase operation feedback circuit 6 is normally connected, and the phase difference $\theta_1$ between the torsional excitation voltage and its current is automatically controlled to be optimally zero. The ultrasonic motor 1, therefore, can be continuously driven in the stable rotational speed range of 480 to 515 rpm.

In this embodiment as described above, by tracking the frequency so that the phase difference between the torsional excitation voltage and its current is minimized, the rotational speed of the ultrasonic motor can be kept stable.

As has been described above, the ultrasonic motor driver of the present invention comprises the voltage-current phase difference detector for detecting the phase difference between the applied voltage and the current of the torsional vibration piezoelectric element, and the phase shifter for adjusting the phases of the voltages applied to the longitudinal and torsional vibration piezoelectric elements. Therefore, the ultrasonic motor can be driven at a constant rotational speed even if an application environment, e.g., an external force or temperature is changed.

What is claimed is:

1. An ultrasonic motor drive, comprising:
    an ultrasonic motor of the standing wave type using a longitudinal/torsional vibrator assembly as a stator, excited by a voltage of a high-frequency as an ultrasonic frequency and having first and second piezoelectric elements for respectively generating longitudinal and torsional vibrations,
    voltage-current phase difference detecting means for detecting a phase difference between a voltage and a current applied to said second piezoelectric element, and
    phase shifting means for adjusting phases of two voltages applied to said first and second piezoelectric elements so that the phase difference detected by said voltage-current phase difference detecting means is minimized.

2. An ultrasonic motor driver according to claim 1, further comprising: phase operation feedback means for converting the phase difference detected by said voltage-current phase difference detecting means to a voltage and for feedback-controlling said phase shifting means so that the converted voltage is minimum, and wherein said phase shifting means adjusts the two voltages to have an optimal phase difference by controlling of said phase operation feedback means.

3. An ultrasonic motor driver according to claim 1, wherein said phase shifting means adjusts the phases of the two voltages so that the phase difference detected by said voltage-current phase difference detecting means is zero.

* * * * *